US005986895A

United States Patent [19]
Stewart et al.

[11] Patent Number: 5,986,895
[45] Date of Patent: Nov. 16, 1999

[54] ADAPTIVE PULSE WIDTH MODULATED RESONANT CLASS-D CONVERTER

[75] Inventors: Neal George Stewart, Tsuen Wan; Wing Ling Cheng, Taipo; Chau Hon Yu, Kwai Chung, all of The Hong Kong Special Administrative Region of the People's Republic of China

[73] Assignee: Astec International Limited, The Hong Kong Special Administrative Region of the People's Republic of China

[21] Appl. No.: 09/092,425

[22] Filed: Jun. 5, 1998

[51] Int. Cl.⁶ .......................... H02M 3/335; H02M 7/537
[52] U.S. Cl. ................................ 363/16; 363/97; 363/131
[58] Field of Search .................................. 363/16, 17, 24, 363/25, 97, 98, 131, 132

[56] References Cited

U.S. PATENT DOCUMENTS

| | | | |
|---|---|---|---|
| 4,814,962 | 3/1989 | Magalhaes et al. | 363/16 |
| 5,159,541 | 10/1992 | Jain | 363/26 |
| 5,285,372 | 2/1994 | Huynh et al. | 363/132 |
| 5,546,294 | 8/1996 | Schutten et al. | 363/17 |
| 5,612,860 | 3/1997 | Meszlenyi | 363/49 |
| 5,615,093 | 3/1997 | Nalbant | 363/25 |

OTHER PUBLICATIONS

Sayed–Amir El–Hamamsy, Member, IEEE, IEEE Transactions on Power Electronics, vol. 9, No. 3, May 1994, "Design of High–Efficiency RF Class–D Power Amplifier".

Praveen K. Jain, Senior Member, IEEE, Andre St–Martin, and Gary Edwards, IEEE Transactions on Power Electronics, vol. 11, No. 3, May 1996, "Asymmetrical Pulse–Width–Modulated Resonant DC/DC Converter Topologies".

Louis Robert Nerone, IEEE Transactions on Power Electronics, vol. 12, No. 3, May 1997, "Design of a 2.5–MHZ, Soft–Switching, Class–D Converter for Electrodeless Lighting".

David C. Hamill, Department of Electronic and Electrical Engineering, University of Surrey, Guildford GU2 5XH, United Kingdom, IEEE 1996, "Class DE Inverters and Rectifiers for DC–DC Conversion".

*Primary Examiner*—Matthew Nguyen
*Attorney, Agent, or Firm*—Coudert Brothers

[57] ABSTRACT

Switching losses at high line in variable-input Class-D resonant DC-to-DC power converters regulated by changing the duty cycle of the switching transistors are avoided by making the turn-off time of the discharging switch dependent upon the current in the resonant transformer primary circuit, thereby preserving bidirectional zero-voltage switching. Losses due to asymmetrical high current pulses in one arm of the rectified output can be mitigated by use of MOSFETs as synchronous rectifiers to take the place of rectifying diodes.

9 Claims, 12 Drawing Sheets

ADAPTIVE PULSE WIDTH MODULATED RESONANT CLASS-D CONVERTER

BACKGROUND OF THE INVENTION

1. Field of the Invention

This invention relates to high-frequency resonant DC-to-DC power converters, and more specifically to such a converter in which output voltage regulation is maintained by adaptively varying the on time of two switching devices controlled by asymmetric pulse width modulation.

2. Description of the Prior Art

The evolution of present-day DC-DC converter technology focuses primarily on improvements in power density, efficiency, electromagnetic interference reduction, and thermal management. Silicon semiconductor devices are preferred as the main power elements because they are relatively inexpensive, are readily available, and come in many forms suitable for a large variety of designs. There is, however, a practical performance limit for conventional soft-switched topologies using such devices as the switching frequency is increased to improve power density. Consequently, full resonant topologies have become a desirable substitute for conventional modulator-controlled pulse width modulation (PWM) topologies.

One conventional type of resonant converter is the Class-D converter. Class-D converters have some unique advantages: 1) the maximum switching voltage across the switching devices is clamped to the input voltage, so when metal oxide silicon field effect transistors (MOSFETs) are used as the switching elements, devices with lower conduction resistance and lower withstanding voltage can usually be used; 2) when MOSFETs are used, the body diode is topology-friendly; 3) the maximum voltage across the transformer body is lower, thereby facilitating the transformer insulation design; 4) the waveform is partially sinusoidal, which results in lower harmonic content; 5) the resonant inductance can be integrated with the transformer; and 6) no large-value secondary choke is required for energy storage.

Class-D converters are typically operated on a 50—50 duty cycle in which each switching transistor is driven for slightly less than 50% of the operating frequency cycle, leaving short dead times in each cycle during which soft switching (i.e. switching at zero voltage and/or zero current to minimize dynamic losses) can occur. A Class-D converter operating in this mode at a fixed frequency is incapable of output regulation. Consequently, regulation in these converters is usually achieved by varying the switching frequency, a method which is not usable in synchronized circuits such as are common in the telecommunications industry.

U.S. Pat. No. 5,159,541 to Jain discloses a resonant converter which regulates output by varying the respective duty cycle of two switching transistors while keeping the frequency constant. This method of asymmetrical PWM of a resonant converter achieves output control by generating a variable-amplitude AC fundamental component in the power transformer input.

There are, however, two problems with this approach. One is that the topology of U.S. Pat. No. 5,159,541 requires a large capacitor in parallel with the MOSFET switch through which the resonant circuit discharges, in order to maintain lossless zero voltage switching of both switches. Large capacitors are an impediment to miniaturization and are therefore undesirable. If this capacitor is omitted, however, the MOSFET which charges the resonant circuit will not switch at zero voltage when the duty cycles of the two switches are made highly unequal in order to regulate the converter's output in the face of large input voltage variations. Such non-zero-voltage switching causes large power dissipation losses.

Another problem with variable duty cycle control is that the regulating asymmetry of the gate drive, which becomes more pronounced as the input line voltage increases, reflects to the secondary side of the isolation transformer and causes a very significant current magnitude difference between the rectifiers on the two secondary windings. This in turn causes a huge power dissipation on one of the rectifier arms, and consequently a large drop in efficiency at high line voltage (if low line is chosen as the 50% duty cycle condition).

SUMMARY OF THE INVENTION

The present invention overcomes the efficiency problem of the asymmetric PWM approach by providing an adaptive pulse width control for a standard Class-D resonant converter. The adaptive control of this invention operates to turn off the discharging MOSFET of the resonant circuit earlier when a higher current is sensed with increasing line voltage. The on time of the charging MOSFET is controlled by a negative feedback from the converter output. The on times of the two MOSFETs are adjusted independently of each other by the adaptive circuitry, and there is no straight relationship between them. Consequently, although the adaptive control method of this invention is considerably more efficient than ordinary PWM in a standard Class-D converter it does not operate the converter at a fixed frequency as the asymmetric control of the prior art does. Losses due to the asymmetry of the rectified secondary currents are mitigated by using MOSFETs as the rectifying elements.

Broadly stated, the present invention comprises a method for controlling the operation of a Class-D resonant DC-to-DC power converter having a transformer and using first and second alternately turned on switches to drive a resonant circuit including the primary winding of said transformer so as to produce a high-frequency alternating current in said transformer primary. The method includes the steps of: a) turning said first switch on for a first length of time in a first part of each switching cycle, said first length of time being a function of the output voltage of said converter; b) turning said second switch on in a second part of each switching cycle, following the turn-off of said first switch; and c) turning said second switch off: i) a predetermined minimum time after turn-on if the current in said resonant circuit is below a predetermined threshold at said minimum time; ii) a predetermined maximum time after turn-on if the current in said resonant circuit remains above said predetermined threshold from said minimum time to said maximum time; and iii) at the transition of said resonant circuit current through said predetermined threshold if that transition occurs between said minimum time and said maximum time.

Broadly stated, the present invention also comprises a Class-D resonant DC-to-DC power converter, comprising: a) a variable-voltage DC input; b) an output: c) first and second switches connected in series across said input; d) a transformer having a primary and at least one secondary winding, each said secondary windings being connected through rectifying and filtering circuitry to said output of said converter; e) said primary winding being connected, in series with a capacitor, across said second switch, said winding and capacitor forming a resonant circuit; f) a pulse width modulation apparatus connected to said switches and arranged to alternately turn said switches on with a variable duty cycle so as to produce an alternating current in said winding, said duty cycle being a function of said converter output; and g) adaptive circuitry arranged to turn said second switch off when the current in said resonant circuit drops through a predetermined level between a predetermined minimum time and a predetermined maximum time after turn-on.

DESCRIPTION OF THE PREFERRED EMBODIMENTS

Figure 1:
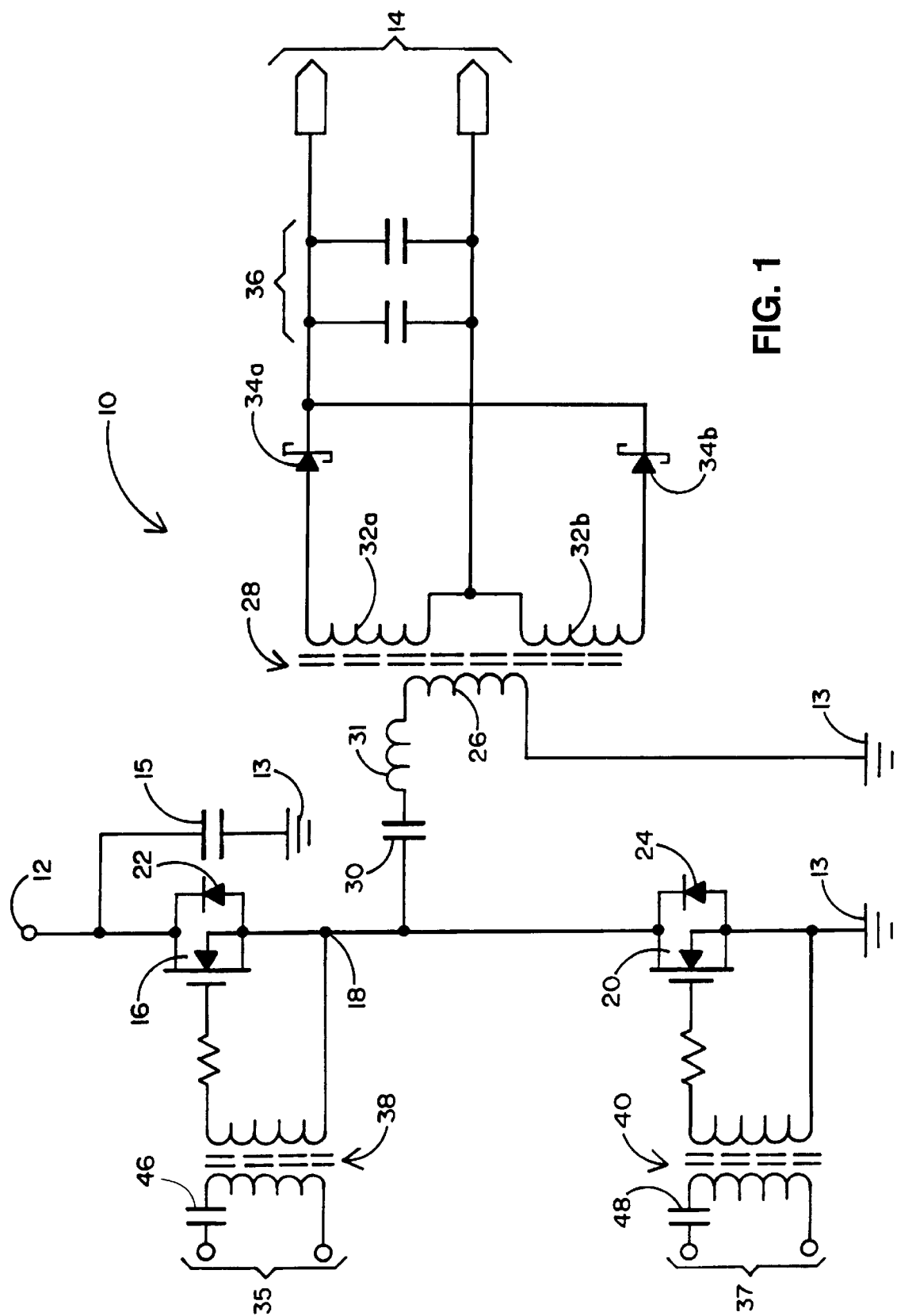
FIG. 1 is a circuit diagram of a typical Class-D converter in which the invention is useful.

FIG. 1 illustrates a typical Class-D converter circuit 10 in which the present invention is useful. The input of the converter 10 is DC power applied between the positive rail 12 and the negative rail or ground 13. The input voltage on rail 12 may vary between about 200V and 380V in a typical installation to produce a nominal 5V DC at output 14. Any residual AC component in the DC input is filtered off by capacitor 15.

A charging MOSFET 16 is connected between the rail 12 and junction 18, and a discharging MOSFET 20 is connected between the junction 18 and ground 13. Diodes 22, 24 represent the body diodes of MOSFETs 16 and 20. The primary winding 26 of a high-frequency transformer 28 is connected in series with a resonant capacitor 30 and inductance 31 representing the stray inductance of the primary circuit between the junction 18 and ground 13. Two secondary windings 32a and 32b, in cooperation with rectifying diodes 34a, 34b, provide unsmoothed 5V DC power to the filter network 36 where it is smoothed to become the nominal 5V DC at output 14.

Figure 2:
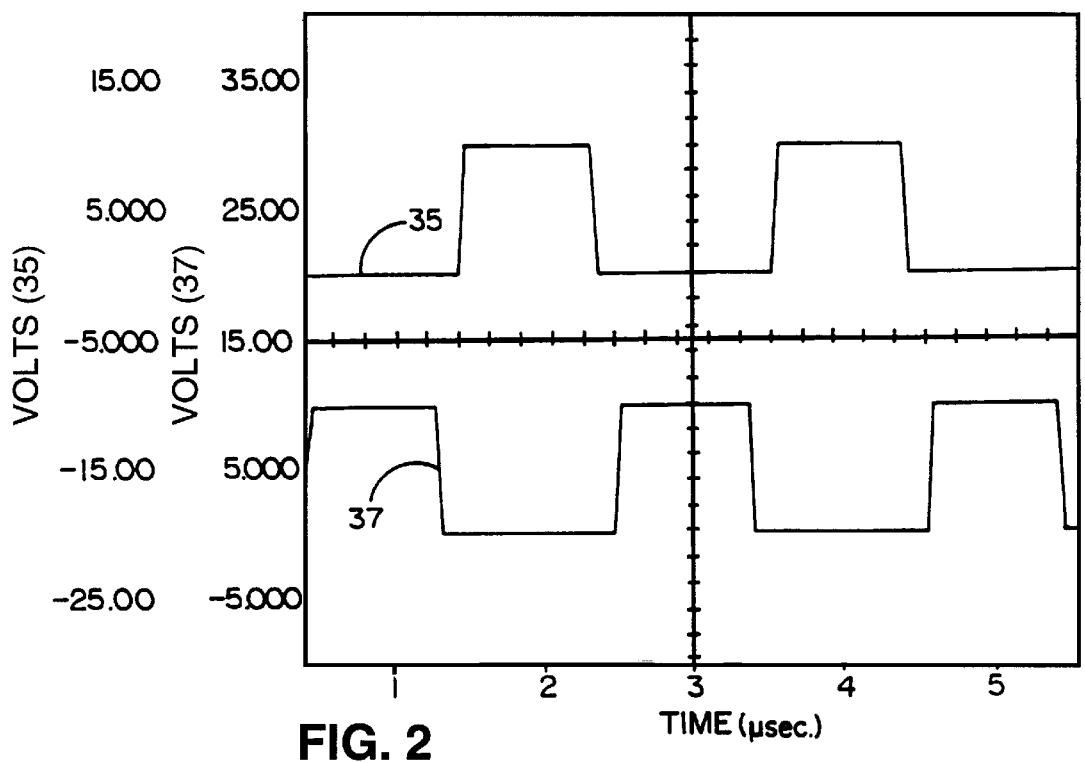
FIG. 2 is a time-amplitude diagram showing the gate drive signals of the circuit of FIG. 1 at low line.

To operate the circuit 10 in a conventional manner, the MOSFETs 16 and 20 are turned on alternately by square-wave signals 35, 37 generated by a pulse width modulator (not shown in FIG. 1) and transmitted to the gates of MOSFETs 16, 20 through isolation transformers 38,40 respectively. The primary windings 42,44 of the transformers 38,40 are resonant with the capacitors 46, 48, respectively, at the frequency (hereinafter referred to as the pulse width modulation (PWM) frequency) of the square wave input 35, 37. Short settling intervals are provided in both switching directions between the turn-off of one of the MOSFETs 16, 20 and the turn-on of the other. This gate drive is illustrated in FIG. 2, in which curve 35 represents the signal applied to the gate of MOSFET 16, and curve 37 represents the signal applied to the gate of MOSFET 20.

The resonant frequency of the series circuit formed by the leakage inductance of transformer primary 26, the stray inductance 31, and the capacitor 30 is designed to be lower than the PWM frequency. This results in a non-zero current turn-off of both MOSFETs 16, 20. The residual current at the turn-off of the active MOSFET will reduce the voltage across the inactive MOSFET until that voltage reaches zero. Thereafter, any remaining residual current is directed into the body diode 22 or 24 of the inactive MOSFET. Consequently, the inactive MOSFET then turns on at zero voltage and reverse current.

Figure 3A:
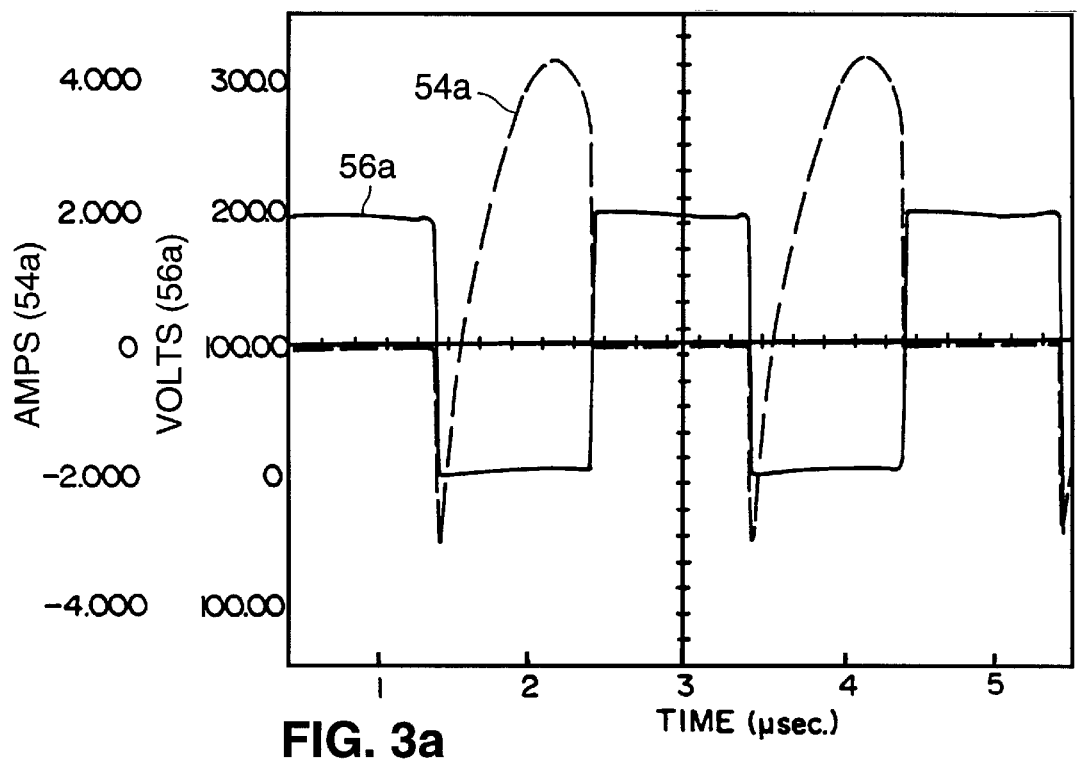
FIGS. 3a and 3b are time-amplitude diagrams showing the switch voltage and switch current of the top and bottom MOSFET, respectively, of the circuit of FIG. 1 at low line.
Figure 3B:
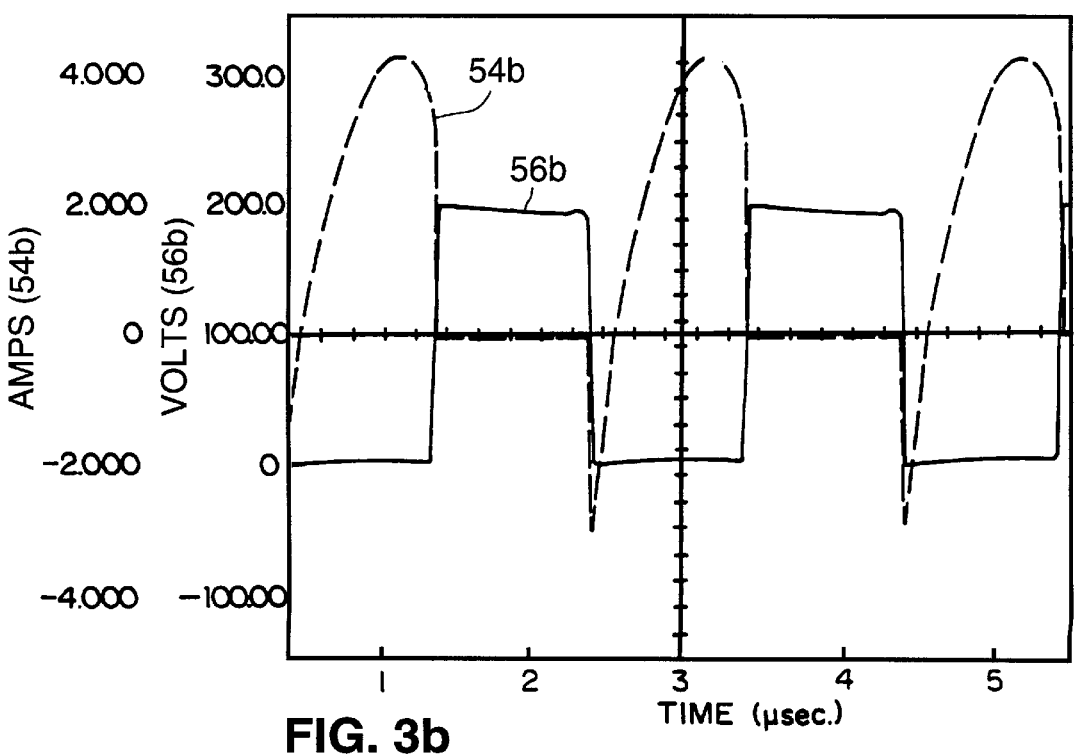
Figure 4A:
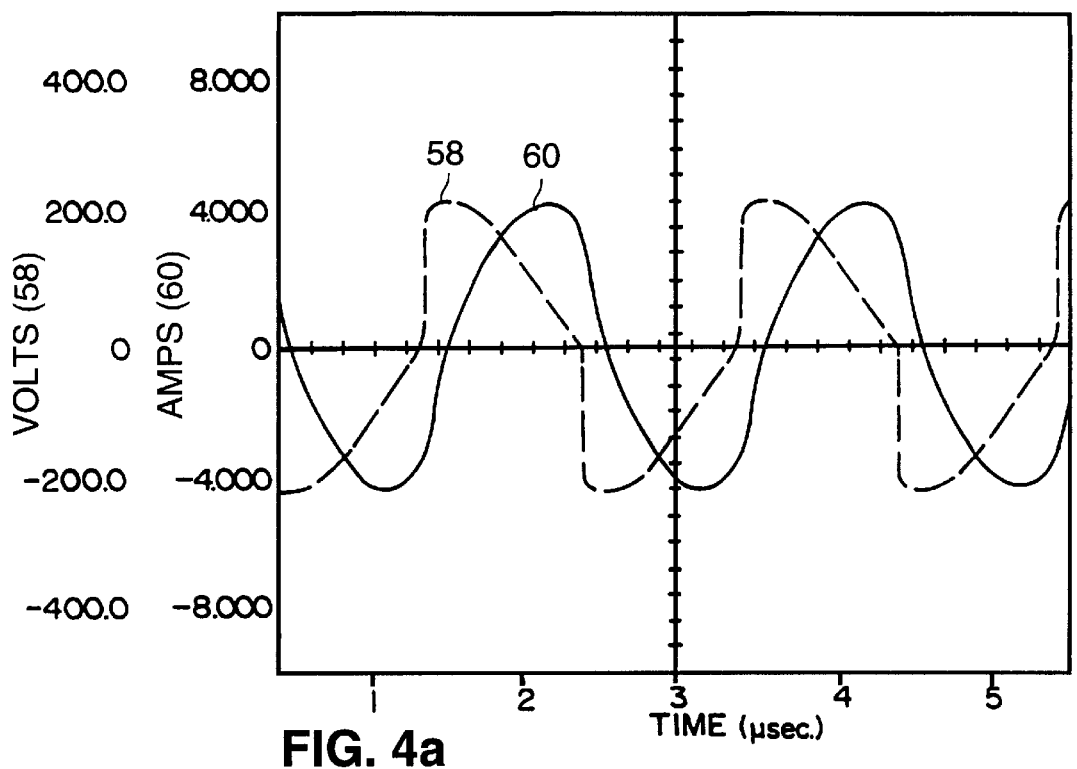
FIG. 4a is a time-amplitude diagram showing the transformer primary voltage and current of the circuit of FIG. 1 at low line.
Figure 4B:
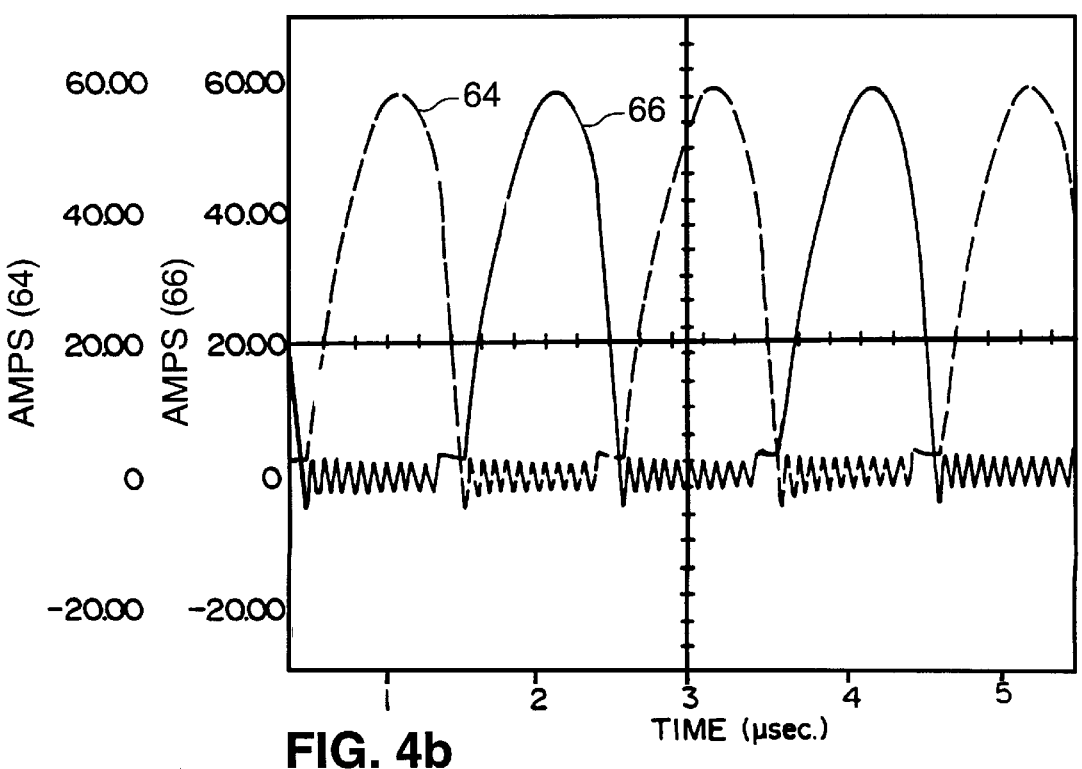
FIG. 4b is a time-amplitude diagram showing the secondary rectifier currents of the circuit of FIG. 1 at low line.

Thus, in the optimal operating condition of equal duty cycles for MOSFETs 16, 20, the converter 10 has two lossy turn-off transitions and two lossless turn-on transitions. The current (curves 54a, 54b) and voltage (curves 56a, 56b) patterns for MOSFET 16 and MOSFET 20, respectively, are shown in FIGS. 3a and 3b for the optimum equal duty cycle condition at a line voltage of 200V (low line). The corresponding transformer primary voltage (curve 58) and current (curve 60) are shown in FIG. 4a, and the corresponding currents in rectifiers 34a (curve 64) and 34b (curve 66) are shown in FIG. 4b.

The optimum conditions of a Class-D converter described above are present only as long as the MOSFETs 16, 20 have equal duty cycles. This, however, is not always the case because it is necessary to vary the duty cycle in order to regulate the output voltage with varying input voltages. A practical DC-to-DC converter has the following typical input/output requirements:

1) a roughly 2:1 input voltage range (e.g. 180–400V);

2) a 10% output variation through the range (e.g. 4.5 to 5.5V for a nominal 5V output).

A Class-D converter provides maximum output when MOSFETs 16 and 20 have equal duty cycles. Therefore, a fundamental design criterion is to determine the transformer turns ratio and leakage inductance so that it will provide nominal output voltage +10% at minimum input voltage (low line) at full load current. Because the resonant frequency of the transformer primary circuit is lower than the PWM frequency, the circuit is inductive, and the turns ratio has to be reduced to take this into account. Also, the difference between the resonant transformer frequency and the PWM frequency has to provide a sufficiently high turn-off current in each MOSFET to cause a zero voltage turn-on of the other MOSFET within a reasonable load range. Thus, the performance of the circuit 10 at maximum input voltage (high line) is dictated by the performance requirements at low line.

Figure 5:
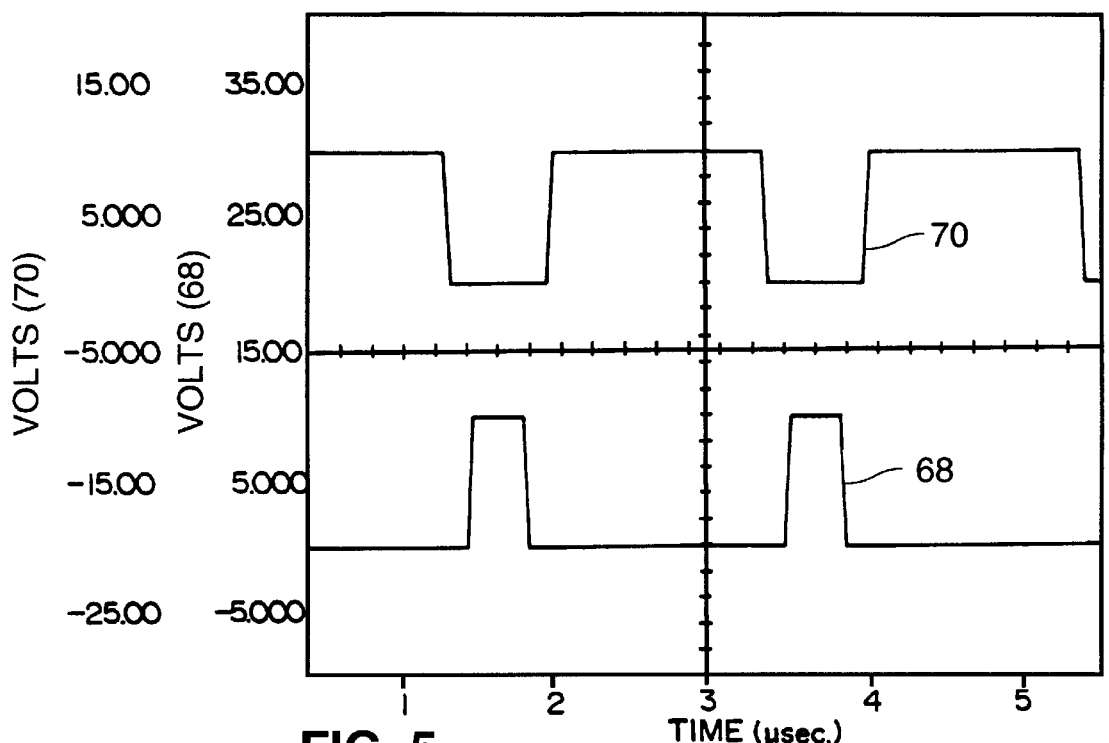
FIG. 5 is a time-amplitude diagram similar to FIG. 2 but showing the conditions of the gate drive signals of the circuit of FIG. 1 at high line.
Figure 6:
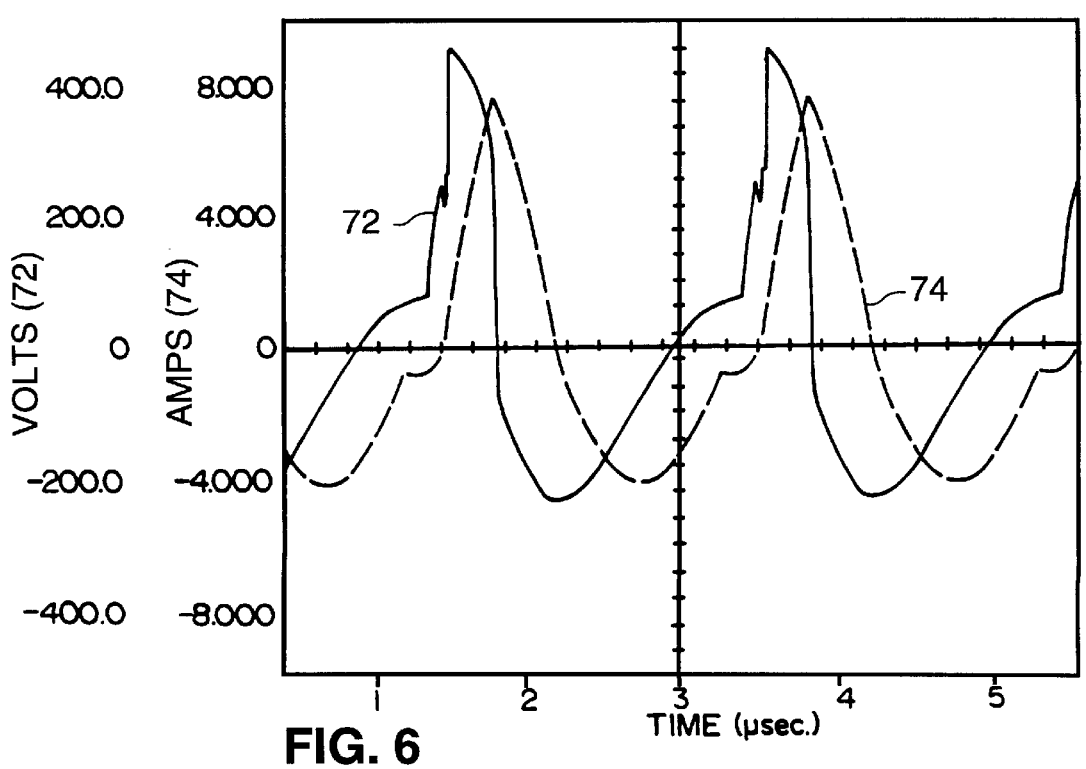
FIG. 6 is a time-amplitude diagram showing the transformer primary voltage and current at high line under the conditions of FIG. 5.
Figure 7A:
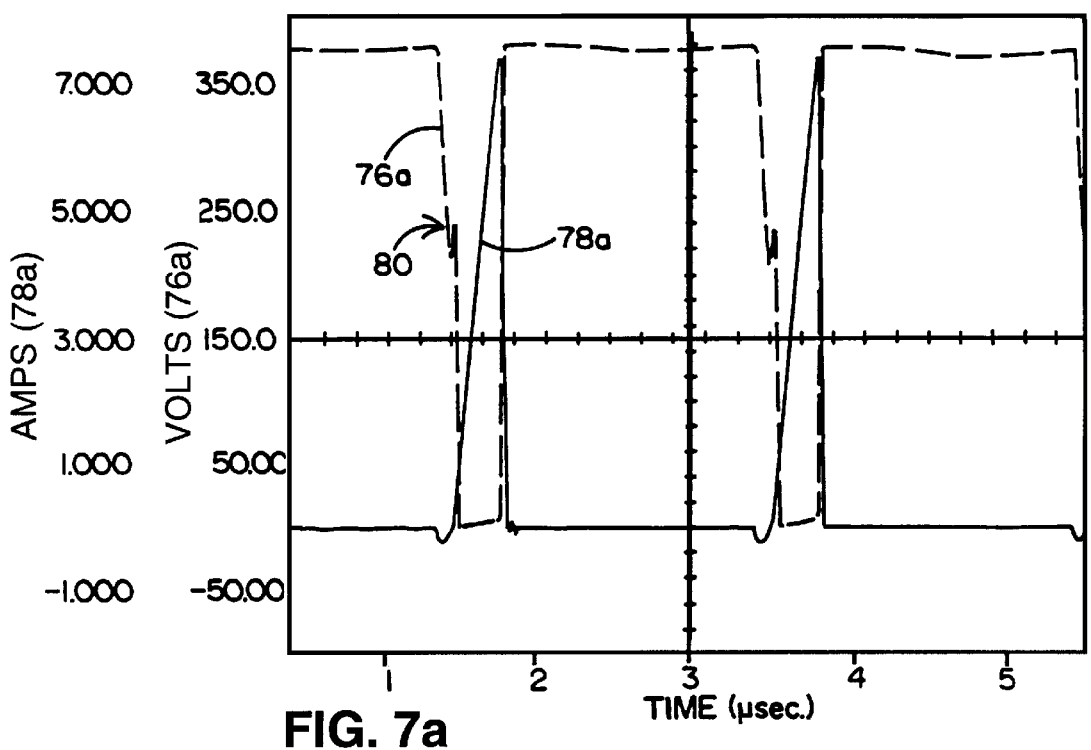
FIGS. 7a and 7b are time-amplitude diagrams similar to FIGS. 3a and 3b but showing the conditions at high line under conventional asymmetric control.
Figure 7B:
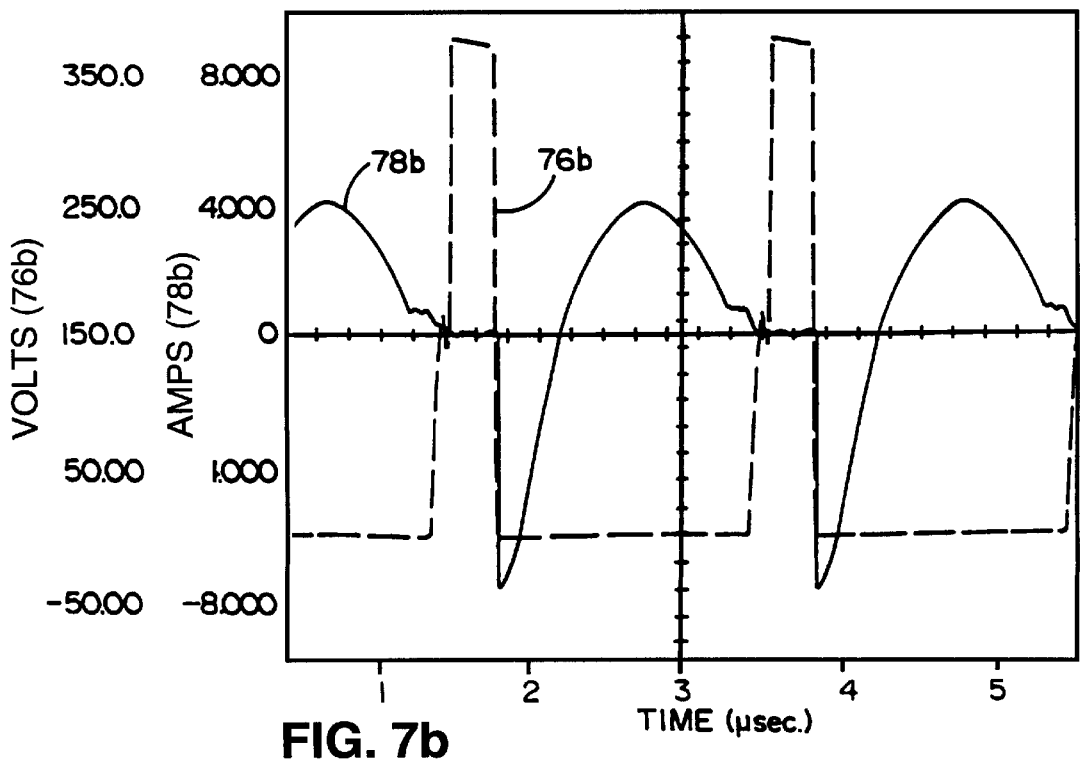

FIGS. 5 and 6 illustrate the gate drive pulses (curve 68 for MOSFET 16, curve 70 for MOSFET 20 in FIG. 5) and the transformer primary voltage (curve 72 in FIG. 6) and current (curve 74 in FIG. 6) in the circuit of FIG. 1 at high line (380V input) under conventional asymmetric drive conditions. FIGS. 7a and 7b show the voltages (curves 76a, 76b) and currents (curves 78a, 78b) of MOSFETs 16 and 20, respectively, under these conditions.

An examination of FIGS. 7a and 7b shows the asymmetry of the switching currents. The current 78a of MOSFET 16 is higher but shorter in duration. The turnoff current of MOSFET 16 is quite high and maintains the zero voltage turn-on of MOSFET 20. On the other hand, the current 78b is lower and lasts for a longer time interval. As the turn-on time of MOSFET 20 increases (curve 70, FIG. 5), the frequency of the half-cycle drops toward the natural frequency of the series resonant circuit 26, 30, 31 (FIG. 1). This in turn lowers the turn-off current of MOSFET 20 to the point where full zero voltage switching is no longer possible. This effect is graphically shown in FIG. 7a by the kink 80 in curve 76a which occurs at the turn-on time of MOSFET 16 and causes the turn-on of MOSFET 16 to occur at about 220V.

Thus, in a practical DC-to-DC Class-D resonant converter, it is very likely that the converter will lose one lossless turn-on transition per cycle at high line. Most MOSFET devices have an appreciable output capacitance, and therefore a significant turn-on charge voltage loss. Losing one of the lossless turn-on transitions in each cycle at high line will thus result in a significant reduction in efficiency. The higher the operating frequency of the converter, the worse this reduction gets. For example, in a typical 200 W converter running at 500 kHz, losing one lossless turn-on per cycle results in extra power dissipation of about 12 W.

Figure 8:
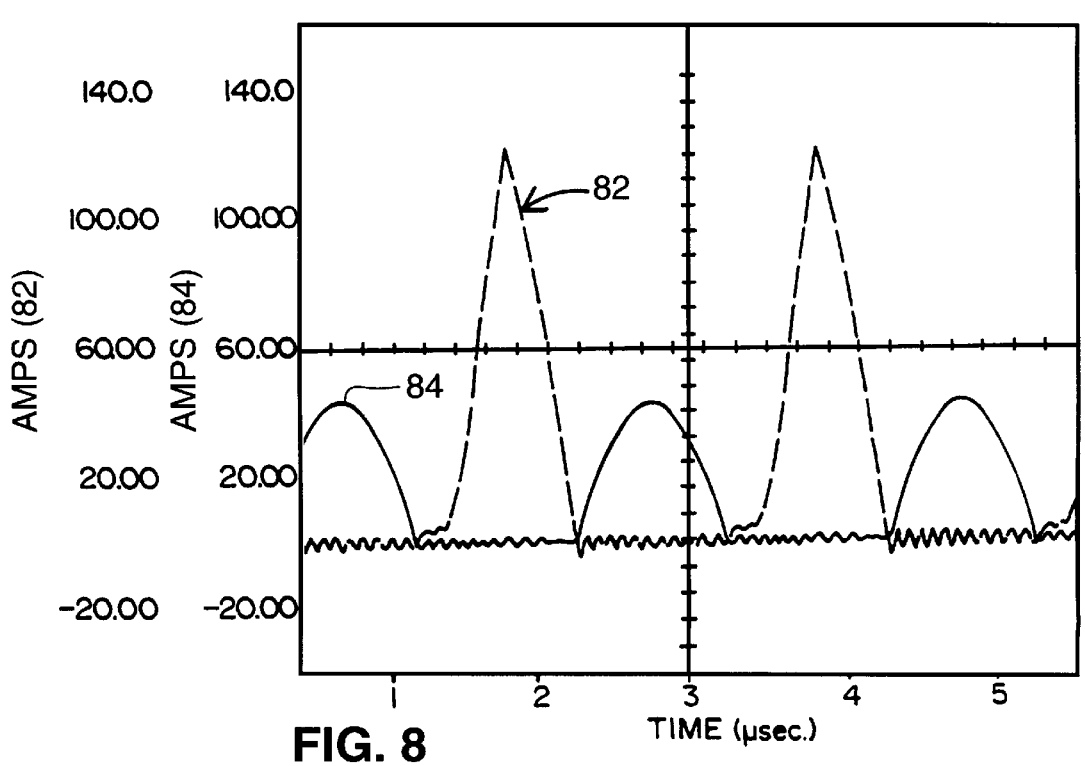
FIG. 8 is a time-amplitude diagram showing the secondary rectifier currents at high line under the conditions of FIG. 5.

Another source of efficiency problems in the conventional Class-D asymmetrically controlled converter of FIG. 1 is illustrated in FIG. 8, which shows the rectifier currents in diodes 34a (curve 82) and 34b (curve 84) at high line. Comparing FIG. 8 with FIG. 4b, it will be seen that any departure from an equal duty cycle for MOSFETs 16, 20 (low line) results in a very significant current magnitude difference between rectifier diodes 34a and 34b. This causes a huge power dissipation on one of the rectifier arms, with a resulting efficiency drop of as much as 20 W in a typical 200 W, 500 kHz converter.

The present invention eliminates the above-described losses in two ways: 1) by adaptively modifying the turn-on time of MOSFET 16 to maintain its zero-voltage turn-on throughout the input range; and 2) by providing synchronous rectifiers to reduce the effect of high peak current on the secondary side.

Figure 9:
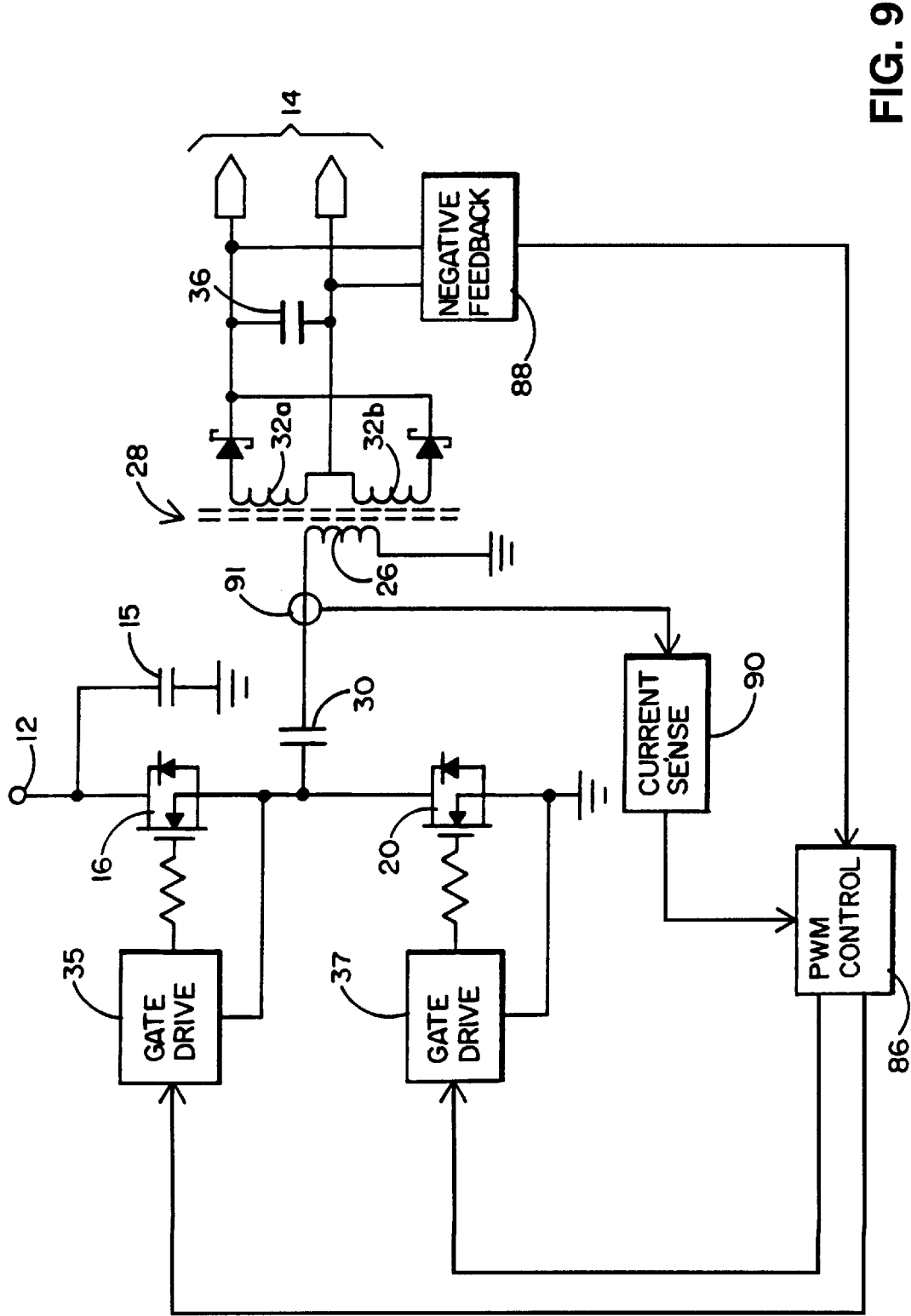
FIG. 9 is a partial block diagram of the circuit of FIG. 1 modified for adaptive control according to the present invention.

The adaptive modification of the MOSFET turn-on times requires sensing of the transformer primary current (i.e., the resonant current) in addition to feedback of the output voltage, as is commonly used in the PWM control of DC-to-DC converters. A block diagram of an adaptive control system in accordance with the present invention is shown in FIG. 9. As seen in FIG. 9, the PWM control block 86 is fed by a negative feedback block 88 from the converter's output 14, and by a resonant current sense block 90 connected to a current pick-off point 91 at the input to transformer 28.

Based on these inputs 88,90, the PWM control 86 operates according to the following operational sequence:
1) Turn MOSFET 16 on for a time determined by the negative feedback input 88 but no longer than a predetermined maximum time;
2) Turn MOSFET 16 off;
3) Provide a short dead time to allow zero-voltage turn-on of MOSFET 20;
4) Turn MOSFET 20 on for at least a predetermined minimum time $T_{min}$;
5) Between $T_{min}$ and a predetermined maximum time $T_{max}$, act as follows:
   i) If the resonant current sensed by current sense 90 is below a predetermined level at $T_{min}$, turn off MOSFET 20;
   ii) If the resonant current sensed by current sense 90 is above the predetermined level at $T_{min}$, but drops below it before $T_{max}$, turn off MOSFET 20 when the transition occurs; or
   iii) If the resonant current sensed by current sense 90 is still above the predetermined level at $T_{max}$, turn off MOSFET 20 at $T_{max}$;
6) Provide a short dead time to allow zero-voltage turn-on of MOSFET 16 to occur;
7) Return to 1).

The effect of the inventive adaptive control at high line is shown in FIGS. 11, 12, 13a and 13b. Comparing FIG. 13a to FIG. 7a, it will be noted that the voltage curve 92a of MOSFET 16 drops much more steeply, eliminating the kink 80 of FIG. 7a which causes the non-zero-voltage turn-on under conventional asymmetric control. Further indicative of zero-voltage turn-on is the reverse current spike 94 in the current curve 96a of MOSFET 16 just before turn-on. The zero-voltage turn-on of MOSFET 20, however, is not affected, as it still occurs (see current curve 96b) when the steeply dropping voltage curve 92b crosses the zero line.

Figure 10A:
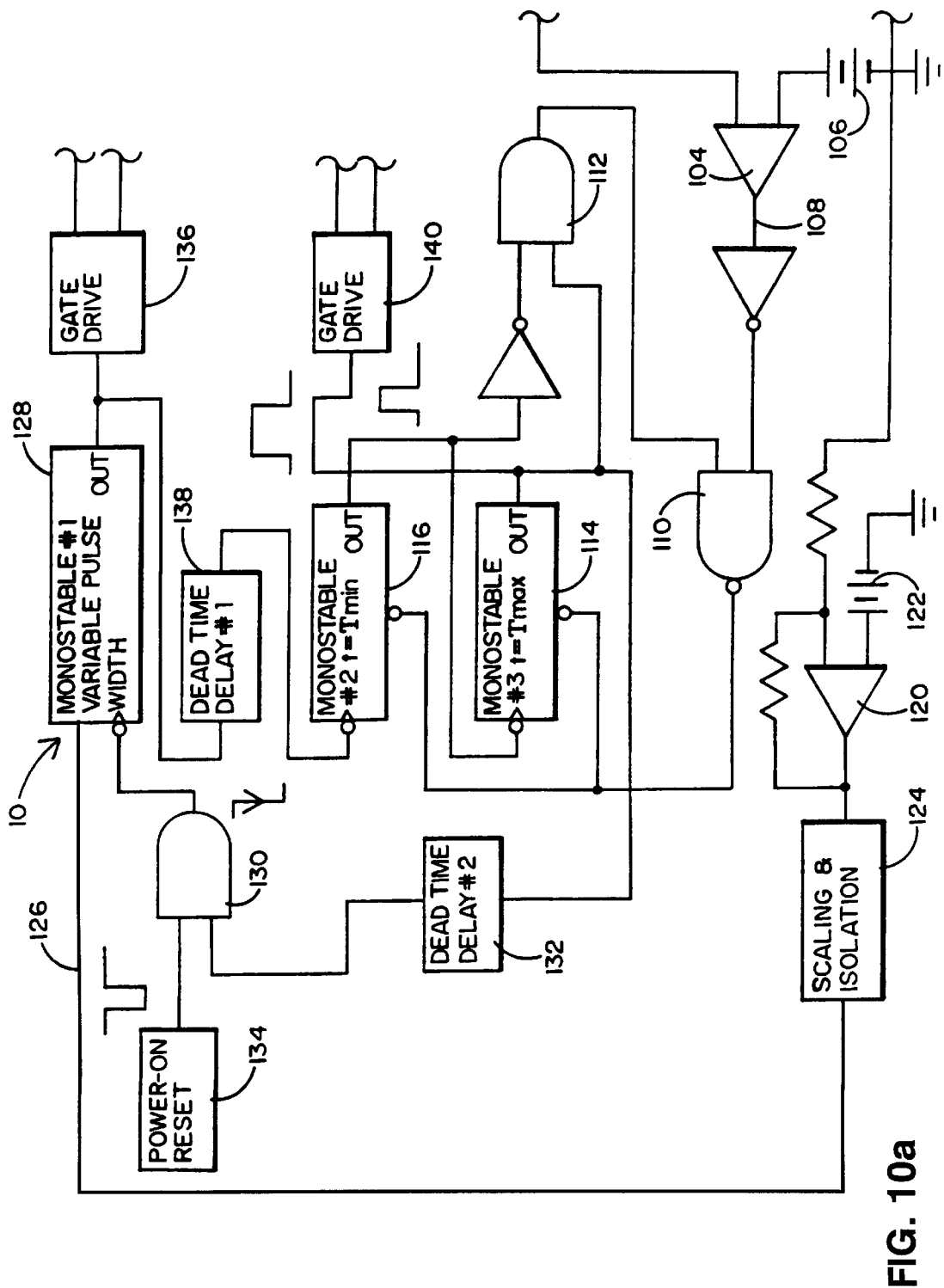
FIGS. 10a and 10b illustrate a circuit diagram, partly in block form, of a preferred implementation of the circuit of FIG. 9.
Figure 10B:
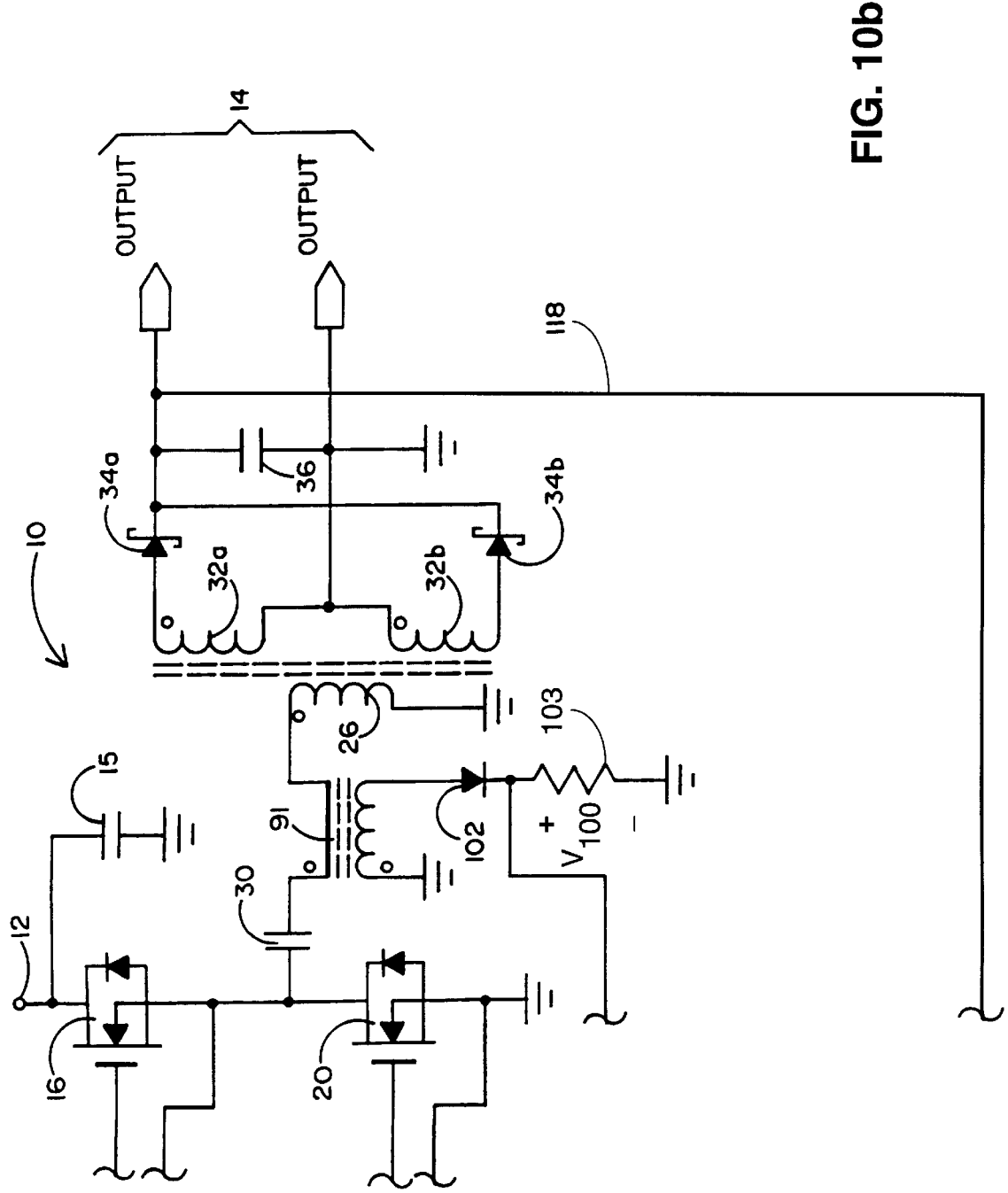
Figure 11:
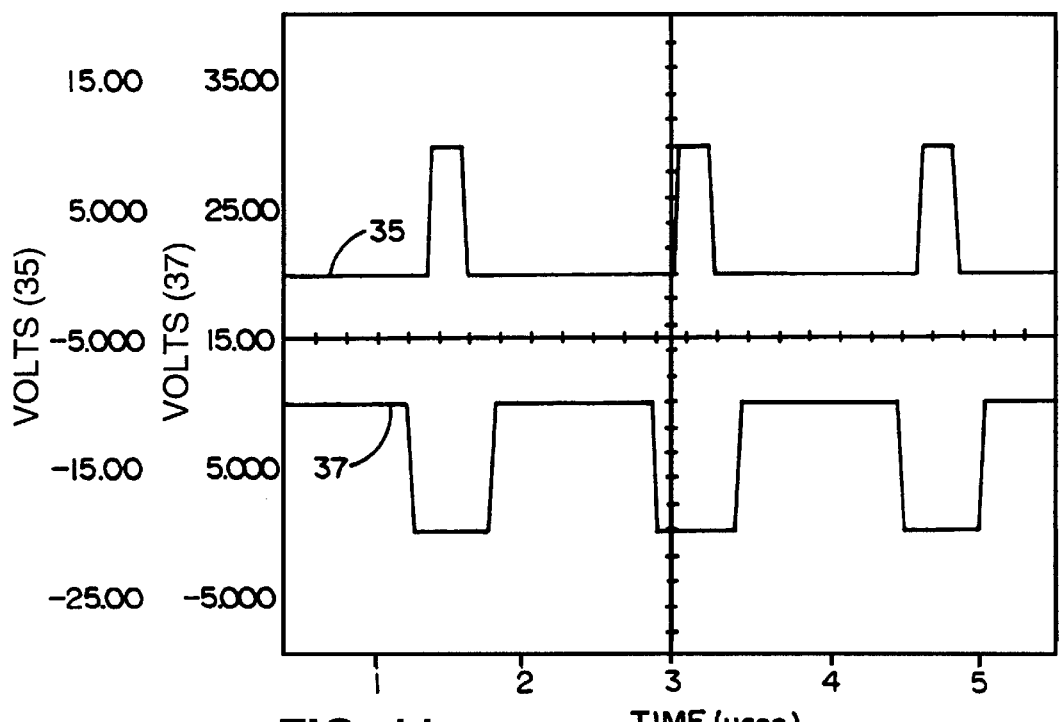
FIG. 11 is a time-amplitude diagram illustrating the MOSFET gate drive signals at high line in the circuit of FIG. 9.
Figure 12:
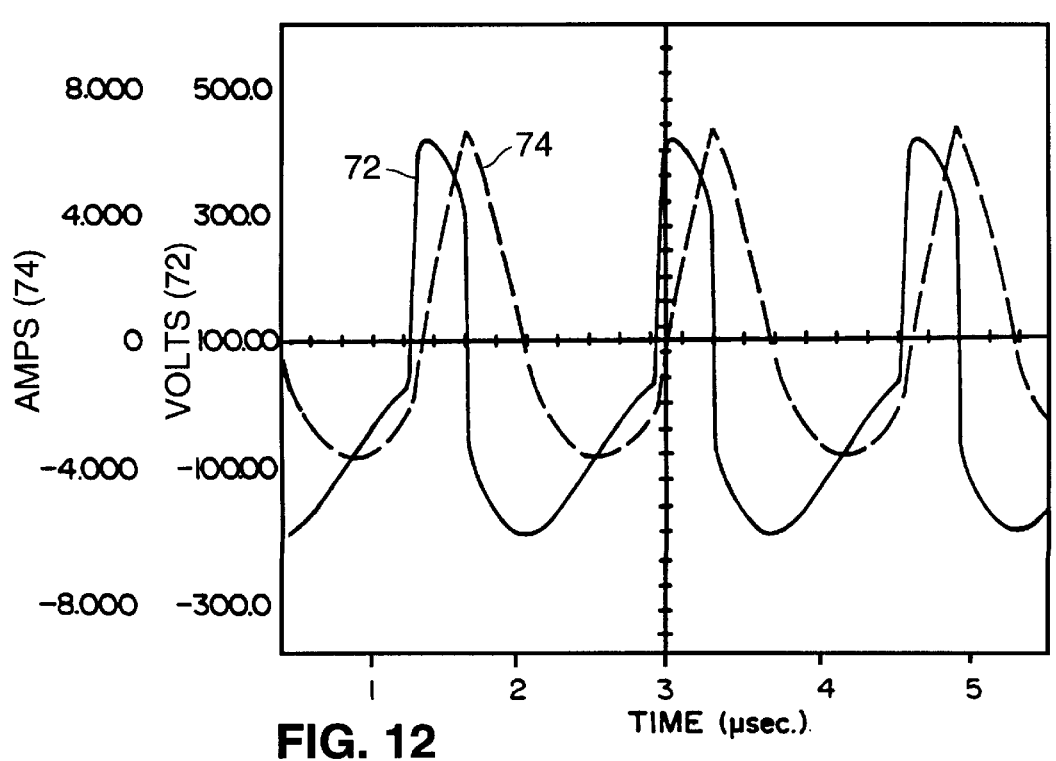
FIG. 12 is a time-amplitude diagram showing the transformer primary voltage and current at high line under adaptive control.
Figure 13A:
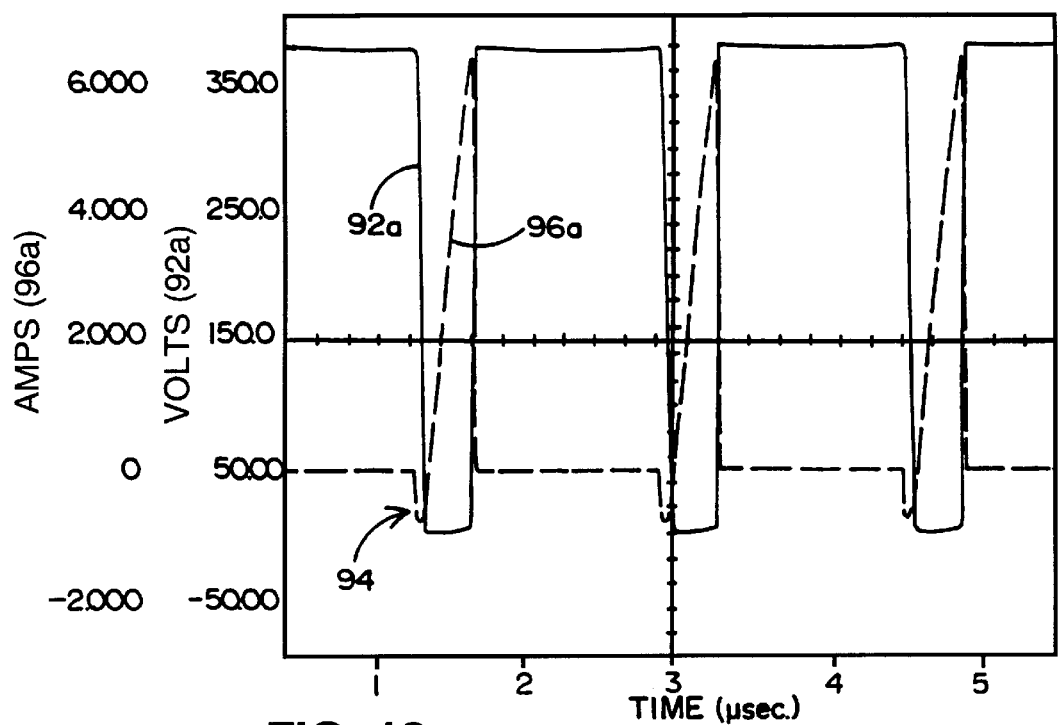
FIGS. 13a and 13b are time-amplitude diagrams similar to FIGS. 3a and 3b but showing the conditions at high line under adaptive control.
Figure 13B:
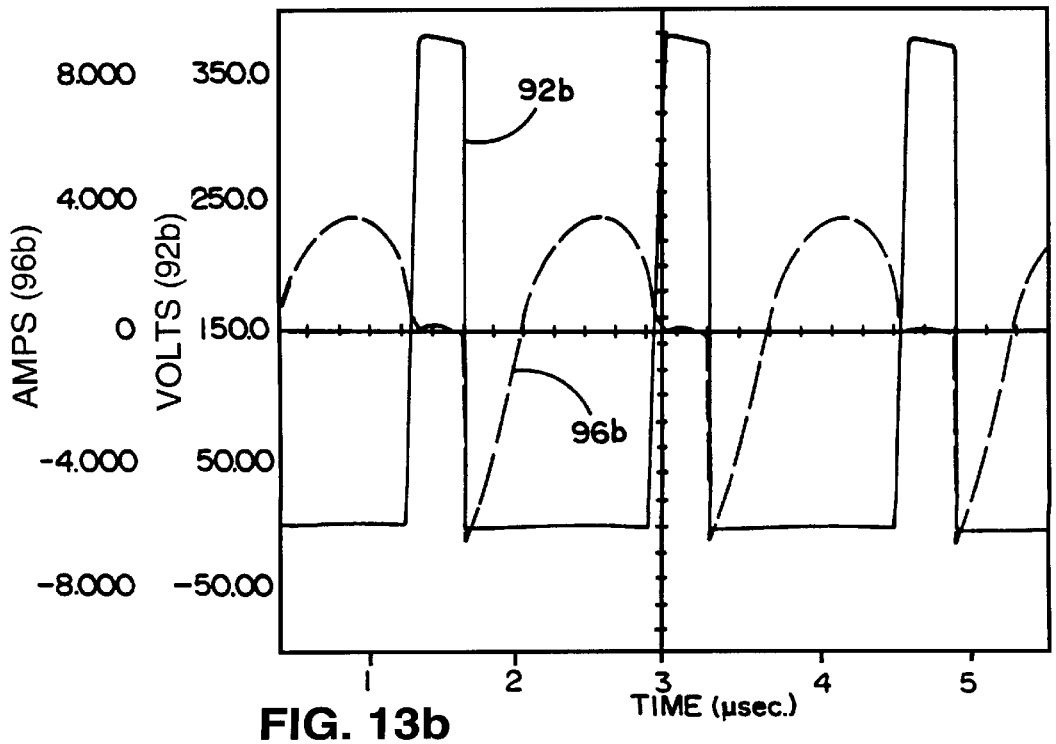

FIGS. 10a and 10b show a specific implementation of the block diagram circuit of FIG. 9 in accordance with the present invention. The resonant current at the current pick off point 91 in the circuit of transformer primary 26 is coupled through a diode 102 to a resistor 103 to convert this current into a voltage signal 100. This signal is logically compared in comparator 104 to a predetermined reference threshold voltage 106. The resulting logic signal 108 is inverted and applied as one input to a NAND gate 110. The other input to the NAND gate 110 is the output of gate 112 which ANDs the output of monostable multivibrator 114 and the inverted output of monostable multivibrator 116. The output of NAND gate 110 is the reset pulse for the inverted reset inputs of multivibrators 114 and 116.

The feedback signal 118 representing the output voltage of the converter 10 preferably comprises the negative feedback input 88 and is applied to the negative input of comparator 120, where it is compared to a reference voltage 122. The output of comparator 120 is processed by a scaling and isolation circuit 124, such as an optocoupler or a magnetic coupler, and is applied as the pulse width control signal 126 to a variable pulse width monostable multivibrator 128. The multivibrator 128 is triggered by the falling edge of the output of AND gate 130. One of the inputs of AND gate 130 is the output of time delay 132 which delays the output of multivibrator 114; the other is a power-on reset pulse from pulse generator 134 which momentarily goes low immediately following power-on but otherwise stays high. The power-on pulse makes sure that the logic circuitry of the converter 10 is properly sequenced and kick-started.

When triggered by the falling edge of the output of AND gate 130, the output of multivibrator 128 goes high for a length of time determined by the control signal 126. This is the on time of MOSFET 16, which is driven in response to the output of multivibrator 128 by gate drive 136. When multivibrator 128 times out, MOSFET 16 turns off, and the falling edge of the output of multivibrator 128, delayed for a short period by time by delay 138, triggers multivibrator 116. The on time of multivibrator 116 is $T_{min}$. Multivibrator 114 has an on time of $T_{max}$ and is connected to be triggered and held on by the output of multivibrator 116.

The output of multivibrator 114 is the on time of MOSFET 20, which is driven by the gate drive 140 under the control of multivibrator 114. Thus, the on time of MOSFET 20 lasts from the triggering of multivibrator 114 until the voltage signal 100 drops below the reference voltage 106, but no shorter than $T_{min}$ and no longer than $T_{max}$.

The losses due to current asymmetry on the secondary side of the converter can be greatly mitigated by using MOSFETs as synchronous rectifiers in addition to, or in replacement of rectifier diodes 34a, 34b. Multiple MOSFETs can be connected in parallel to further minimize conduction losses.

Figure 14:
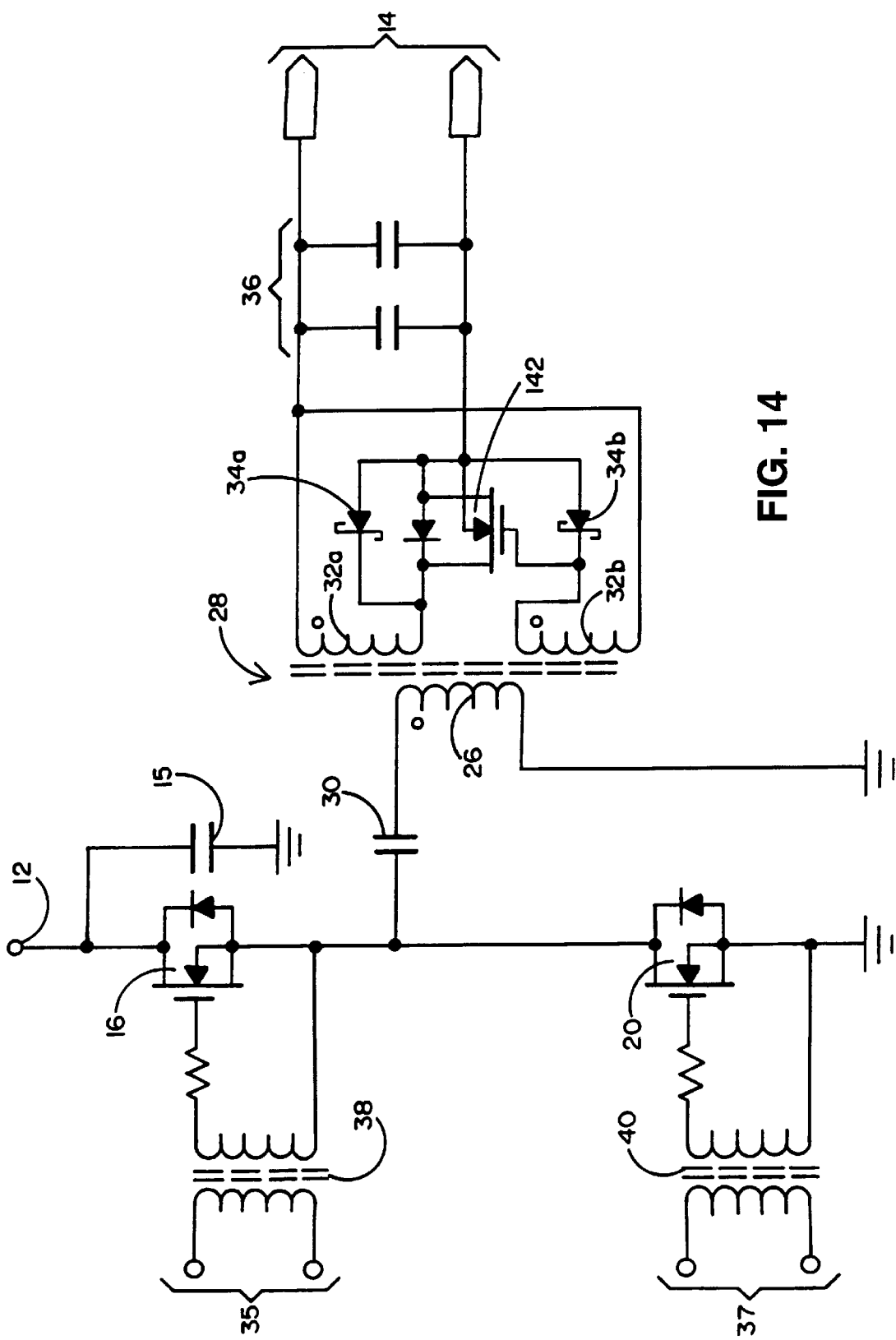
FIG. 14 is a circuit diagram illustrating an alternative embodiment of the circuit of FIG. 9 for reducing asymmetrical secondary current stress and optimizing efficiency.

FIG. 14 uses a MOSFET 142 to reduce the conduction loss on the rectifier arm with the high peak current. Diode 34a may be unnecessary in this configuration, depending on circuit performance and optimization.

It will be seen from the foregoing that adaptive asymmetrical PWM control of a Class-D converter according to the present invention has a number of advantages:

1) It gives the converter the ability to maintain high efficiency over a wide input range by maintaining both lossless turn-on cycles;

2) Frequency variation is limited; a minimum frequency is guaranteed by an appropriate setting of $T_{max}$ and of the maximum on time of MOSFET 16, while a maximum frequency is guaranteed by an appropriate setting of $T_{min}$ and of the minimum on time of MOSFET 16. The ratio of maximum to minimum frequency can usually be designed to be within 3:1, thus making it easier to control the EMI of the converter;

3) It allows further efficiency increases by the addition of synchronous MOSFET rectifiers on the secondary side.

It is understood that the exemplary adaptive pulse width modulated resonant Class-D converters described herein and shown in the drawings represent only presently preferred embodiments of the invention. Indeed, various modifications and additions may be made to such embodiment without departing from the spirit and scope of the invention. Thus, other modifications and additions may be obvious to those skilled in the art and may be implemented to adapt the present invention for use in a variety of different applications.

We claim:

1. A method for controlling the operation of a Class-D resonant DC-to-DC power converter having a transformer and using first and second alternately turned on switches in a switching cycle to drive a resonant circuit including the primary winding of said transformer so as to produce a high-frequency alternating current in said transformer primary, comprising the steps of:

a) turning said first switch on for a first length of time in a first part of each switching cycle, said first length of time being a function of the output voltage of said converter;

b) turning said second switch on in a second part of each switching cycle, following the turn-off of said first switch; and c) turning said second switch off:
   i) a predetermined minimum time after turn-on if the current in said resonant circuit is below a predetermined threshold at said minimum time;
   ii) a predetermined maximum time after turn-on if the current in said resonant circuit remains above said predetermined threshold from said minimum time to said maximum time; and
   iii) at the transition of said resonant circuit current through said predetermined threshold if that transition occurs between said minimum time and said maximum time.

2. The method of claim 1, in which the turn-on of each said switch occurs a predetermined time after the turn-off of the other switch.

3. The method of claim 1, in which the resonant frequency of said resonant circuit is lower than the frequency of said switching cycle.

4. A Class-D resonant DC-to-DC power converter, comprising:

a) a variable-voltage DC input;

b) first and second switches connected in series across said input;

c) an output:

d) a transformer having a primary and at least one secondary winding, said secondary windings being connected through rectifying and filtering circuitry to the output of said converter;

e) said primary winding being connected, in series with a capacitor, across said second switch, said winding and said capacitor forming a resonant circuit;

f) pulse width modulation apparatus connected to said switches and arranged to alternately turn said switches on with a variable duty cycle so as to produce an alternating current in said winding, said duty cycle being a function of said converter output; and g) adaptive circuitry arranged to turn said second switch off when the current in said resonant circuit drops through a predetermined level between a predetermined minimum time and a predetermined maximum time after turn-on.

5. The converter of claim 4, in which the resonant frequency of said resonant circuit is lower than the switching frequency of said pulse width modulation apparatus.

6. The converter of claim 4, further comprising:

h) first and second secondary windings, each of said windings having a first and a second terminal;

i) the first terminal of said first winding and the second terminal of said second winding being connected to one rail of the converter output; and j) the second terminal of said first winding being connected to the other rail of said converter output through a switching transistor, and the first terminal of said second winding being connected to said other rail through a rectifier diode.

7. The converter of claim 4, further comprising:

h) first and second secondary windings, each of said windings having a first and a second terminal;

i) the first terminal of said first winding and the second terminal of said second winding being connected to one rail of the converter output; and j) the second terminal of said first winding being connected to the other rail of said converter output through a first switching transistor, and the first terminal of said second winding being connected to said other rail through a second switching transistor.

8. The converter of claim 4, wherein said adaptive circuitry includes:

i) a first pulse generating device connected to said first switch and arranged to produce a turn-on pulse for said first switch, the length of said pulse being a function of the output voltage of said converter;

ii) a second pulse generating device connected to said first pulse generating device and arranged to produce a timing pulse, of a predetermined length, after the end of said first switch turn-on pulse;

iii) a third pulse generating device connected to said second pulse generating device and said second switch and arranged to produce a turn-on pulse for said second switch for a predetermined time concurrently with said timing pulse but of longer duration; and iv) current-responsive circuitry connected to said third pulse generating device and arranged to reset said third pulse generating device if the current in said resonant circuit drops below a predetermined level after the end of said timing pulse but before the end of said second switch turn-on pulse.

9. A Class-D resonant DC-to-DC power converter, comprising:

a) a variable-voltage DC input;
   b) first and second switches connected in series across said input;
   c) an output:
   d) a transformer having a primary and at least one secondary windings, said secondary windings being connected through rectifying and filtering circuitry to said output of said converter;
   e) said primary winding being connected, in series with a capacitor, across said second switch, said primary winding and said capacitor forming a resonant circuit;
   f) a current sensor element coupled to said resonant circuit to measure a resonant current flowing in said resonant circuit; and
   g) pulse width modulation control apparatus connected to said switches and arranged to alternately turn said switches on in each switching cycle, the duty cycle of said first switch selected so as to regulate the output voltage of said converter and the duty cycle of said second switch selected as a function of said resonant current to reduce the turn-on switching losses of said first switch.

* * * * *